United States Patent
Takafumi

(10) Patent No.: US 7,740,733 B2
(45) Date of Patent: Jun. 22, 2010

(54) OPTICAL ADHESIVE COMPOSITION AND METHOD FOR BONDING OPTICAL COMPONENT

(75) Inventor: Iida Takafumi, Hyogo (JP)

(73) Assignee: Nagase Chemtex Corporation, Osaka (JP)

( * ) Notice: Subject to any disclaimer, the term of this patent is extended or adjusted under 35 U.S.C. 154(b) by 663 days.

(21) Appl. No.: 11/630,606

(22) PCT Filed: Jun. 23, 2005

(86) PCT No.: PCT/JP2005/011498

§ 371 (c)(1),
(2), (4) Date: Jun. 28, 2007

(87) PCT Pub. No.: WO2006/001320

PCT Pub. Date: Jan. 5, 2006

(65) Prior Publication Data

US 2007/0284041 A1      Dec. 13, 2007

(30) Foreign Application Priority Data

Jun. 24, 2004 (JP) .............................. 2004-186767

(51) Int. Cl.
C04B 37/00 (2006.01)
B32B 7/12 (2006.01)
B41J 2/16 (2006.01)
G02B 6/36 (2006.01)

(52) U.S. Cl. ...................... 156/325; 156/326; 156/327; 385/53

(58) Field of Classification Search ......... 156/325–327; 385/53
See application file for complete search history.

(56) References Cited

U.S. PATENT DOCUMENTS

| 5,157,148 A | 10/1992 | Ohmori et al. |
| 5,202,360 A | 4/1993 | Ohmori et al. |
| 2004/0071405 A1* | 4/2004 | Baney et al. .................. 385/50 |

FOREIGN PATENT DOCUMENTS

| EP | 0 196 212 | 10/1986 |
| JP | 61-281113 | 12/1986 |
| JP | 02-000688 | 1/1990 |
| JP | 2000-154351 | 6/2000 |
| JP | 2003-089779 | 3/2003 |
| JP | 2003-089780 | 3/2003 |
| JP | 2003-096424 | 4/2003 |

* cited by examiner

Primary Examiner—Philip C Tucker
Assistant Examiner—Michael N Orlando
(74) Attorney, Agent, or Firm—Edwards Angell Palmer & Dodge LLP

(57) ABSTRACT

Disclosed is an easy to use optical adhesive composition which has lower refractive index than the conventional optical adhesive compositions while having low viscosity, fast curability and excellent heat resistance. Also disclosed are a method for bonding an optical component using such an optical adhesive composition which enables to reduce transmission loss, and an optical device. Specifically disclosed are an optical adhesive composition characterized by comprising at least one acrylate compound represented by the general formula (I) and a photopolymerization initiator, a method for bonding an optical component using such an optical adhesive composition, and an optical device. $Tf\text{-}(O)_a\text{—}(CH_2)_b\text{—}(CF_2)_m\text{—}(CH_2)_b\text{—}(O)_a\text{-}Tf$ (I) wherein a's are the same represent 0 or 1, b's are the same represent 0 or 1, m represents an integer of 4 to 12, and Tf's are the same and represent a glycidyl group or $CH_2\text{=}CH\text{—}C(O)\text{—}$.

16 Claims, No Drawings

OPTICAL ADHESIVE COMPOSITION AND METHOD FOR BONDING OPTICAL COMPONENT

CROSS-REFERENCE TO PRIOR APPLICATIONS

This application is a §371 national phase filing of international application number PCT/JP2005/011498, which has an international filing date of 23 Jun. 2005, and which claims priority to Japanese Patent Application Ser. No. 2004-186767 which has a filing date of 24 Jun. 2004, both of which are incorporated by reference.

1. Technical Field

The present invention relates to an optical adhesive for an optical fiber used in optical communication, measurement, the field of medical treatment, and so on, specifically an optical adhesive comprising a fluorine compound having a specific structure containing an acrylic group or an epoxy group and exhibiting a low refractive index, and a method for bonding an optical component.

2. Background Art

Optical fibers are used in a wide scope such as optical communication, light-applied measurement, an endoscope, and so forth. For example, optical communication is widely used in wide-area or LAN optical communication networks, communication devices equipped in vehicle, the control of electronic products or industrial equipment, and soon. Optical communications are carried via an optical transmission network composed of an optical fiber and various optically transmitting components connected to this fiber, and active optical components such as an optical fiber amplifier. For the connection between the optical fiber and the optical components or between the optical components, an optical adhesive comprising an optical resin is usually used. However, when the number of optical connections using an optical adhesive increases, an increase in transmission loss is expected. Thus, an optical adhesive having a low refractive index is desired.

Since precise positioning and fixing are necessary for connecting optical fibers, a thermosetting adhesive which itself swells or causes a component to be bonded to swell when the adhesive is set or which requires long time for the setting thereof is unsuitable for an optical adhesive. Conventional optical adhesive compositions in general have a refractive index of 1.45 or more, and thus the compositions do not have a sufficient low refractive index. Furthermore, an optical adhesive is required to have such properties as, for example, transparency, good adhesiveness to optical fibers, and adhesiveness under humid conditions based on consideration of use environment.

As techniques that can be used for optical adhesives, mention can be made on a photopolymerizable composition comprising a specific epoxy fluorine compound (see, for example, Patent Document 1); a photopolymerizable composition comprising a specific acrylate-based fluorine compound (see, for example, Patent Document 2 or 3); a photopolymerizable adhesive using an epoxy compound having a fluorinated alkylene group or a trifluorinated methyl group and a specific alicyclic epoxy compound (see, for example, Patent Document 4); and so on. However, the refractive indices of these compositions are approximately 1.45 or more, and thus are not necessarily low refractive indices. Moreover, the compositions each have a high viscosity, and require much time in curing (see, in particular, Patent Document 1). As an optical resin having a refractive index of 1.40 or less, known is a reactant made from a fluorine-containing copolymer and an alkylamino-group-containing compound (see, for example, Patent Document 5). However, this substance is not any adhesive composition.

In the meantime, as an optical resin comprising a fluorine compound containing an acrylic group or an epoxy group, there is, for example, an optical thin film wherein a cured product of an epoxy compound having a fluorine-containing alkylene group is used (see, for example, Patent Document 6). This technique is aiming to improve the performance of an optical coating, and the document states that an optical thin film excellent in scratch resistance can be formed. However, the technique belongs exclusively to a technique field applied to antireflective films, and a composition disclosed therein contains a large amount of a solvent. Thus, the technique is never related to any adhesive composition. A film-forming composition wherein a fluorine-containing polyfunctional acrylate is used is also known (see, for example, Patent Document 7). However, this technique is also related to an antireflective film, and does not belong to the technical field of an adhesive. About perfluoro-group-containing compounds, various epoxy compounds which contain perfluoro groups within a broad scope are further disclosed in Patent Document 8. However, this technique does not pay attention to any specific usage, either, and compounds disclosed in working examples are also different from the compound which has a specific structure in the present invention. As described above, there have not yet been known any optical adhesive which can meet a requirement that the refractive index should be made still lower and further which satisfies various performances, such as low viscosity, quick curing, and heat resistance.

Patent Document 1: Japanese Patent Application Laid-Open (JP-A)-2000-154233
Patent Document 2: JP-A-62-265248
Patent Document 3: JP-A-63-101409
Patent Document 4: JP-A-2003-96424
Patent Document 5: JP-A-10-25388
Patent Document 6: JP-A-11-133207
Patent Document 7: JP-A-2001-262011
Patent Document 8: JP-A-2000-264883

DISCLOSURE OF THE INVENTION

Problems to be Solved by the Invention

In light of the above-mentioned present situation, an object of the present invention is to provide an optical adhesive which can attain a low refractive index and is further excellent in low viscosity, quick curing, and heat resistance so as to be convenient for usage, and a method for bonding an optical component and an optical device wherein this agent is used to make it possible to decrease transmission loss.

Means for Solving the Problems

In order to solve the above-mentioned problems, the inventors have made eager investigations to find out that the above-mentioned object can be attained by using a fluorine compound having a specific structure containing an acrylic group and an epoxy group. On the basis of this finding, the present invention has been made. Accordingly, the invention is an optical adhesive composition comprising: at least one compound represented by the following general formula (I):

$$\text{Tf-(O)}_a\text{—(CH}_2)_b\text{—(CF}_2)_m\text{—(CH}_2)_b\text{—(O)}_a\text{-Tf} \quad \text{(I)}$$

wherein plural a's are the same, and each represent 0 or 1, plural b's are the same, and each represent 0 or 1, m represents an integer of 4 to 12, and plural Tf's are the same and each represent a glycidyl group or $CH_2=CH-C(O)-$; and a photopolymerization initiator.

The invention also includes: a method for bonding an optical component, using the above-mentioned optical adhesive composition; and an optical device comprising an optical fiber and an optical component, wherein the above-mentioned optical adhesive composition is used to bond the optical fiber and the optical component to each other.

Effect of the Invention

The invention can attain a low refractive index and is excellent in low viscosity, quick curing and heat resistance by the above-mentioned structure.

By the above-mentioned structure, the invention attains a refractive index (D-line refractive index, which is represented by $n_D$ in the present specification) of 1.31 to 1.41, the refractive index being measured at 25° C. in a liquid state before the composition is cured.

By the above-mentioned structure, the invention attains a Tg of 30 to 110° C. after the composition is cured.

By the above-mentioned structure, the invention can realize an optical adhesive which meets a requirement that the refractive index should be made still lower and is convenient for use.

By the above-mentioned structure, the invention can realize a method for bonding an optical component and an optical device which each make it possible to decrease transmission loss.

The invention will be described in detail hereinafter.

Best Mode for Carrying Out the Invention

The optical adhesive composition of the invention comprises at least one compound represented by the above-mentioned general formula (I), and a photopolymerization initiator. In the formula (I), plural a's are the same, and each represent 0 or 1, and plural b's are the same, and each represent 0 or 1. Out of these cases, there are: a case where a is 0, and a case wherein a is 1; and in each of these cases a case where b is 0, and a case where b is 1.

As specific examples of the compound represented by the general formula (I), only a structure omitted Tf's present at both ends thereof, is exemplified in the following: when Tf's are each a glycidyl group; $-(CF_2)_m-$, $-(CH_2)-(CF_2)_m-(CH_2)-$, $-O-(CF_2)_m-O-$, $-O-(CH_2)-(CF_2)_m-(CH_2)-O-$ wherein m represents an integer of 4 to 12, preferably 6 to 10; and when Tf's are each $CH_2=CH-C(O)-$; $-(CF_2)_m-$, $-(CH_2)-(CF_2)_m-(CH_2)-$, $-O-(CF_2)_m-O-$, and $-O-(CH_2)-(CF_2)_m-(CH_2)-O-$ wherein m represents an integer of 4 to 12, preferably 6 to 10. Of these, examples wherein a is 1 are preferred from the viewpoint of curing rate. In the optical adhesive composition of the invention, these compounds may be used alone, or may be used in combination of two or more thereof. From the viewpoint of photo-curability, preferred is use of only a compound wherein Tf's are each $CH_2=CH-C(O)-$, or use of any combination of a compound wherein Tf's are each $CH_2=CH-C(O)-$ with a compound wherein Tf's are each a glycidyl group.

If necessary, the composition of the invention may further comprise at least one compound represented by the general formula (II):

wherein c represents 0 or 1, d represents an integer of 0 to 2, n represents an integer of 1 to 11, Xf represents a glycidyl group or $CH_2=CH-C(O)-$, and A represents H or F.

Examples of the compound represented by the general formula (II) include 2,2,2-trifluoroethyl (meth)acrylate, 2,2,3,3-tetrafluoropropyl acrylate, 1H,1H,5H-octafluoropentyl (meth)acrylate, heptadecanefluorodecyl acrylate, 3-(1H,1H,9H-hexadecafluorononyloyl)-1,2-epoxypropane, and 3-(perfluorooctyl)-1,2-epoxypropane. These compounds may be used alone, or may be used in combination of two or more thereof.

The blended amount of the compound represented by the general formula (II) is preferably less than 40 parts by weight per 100 parts by weight of the total of the compound and the compound represented by the general formula (I) from the viewpoint of the photo-curability of the composition. The amount is more preferably less than 35 parts by weight.

A process for producing the compound represented by the general formula (I) or the compound represented by the general formula (II) may be as follows when the compound wherein terminal Tf's or Xf's are each an epoxy group is given as an example: a halogenated epoxy propyl is caused to react with a perfluoro-group-containing di- or mono-alcohol; or a halogenated allyl is caused to react with a perfluoro-group-containing di- or mono-alcohol and subsequently the resultant is oxidized with a peracid such as performic acid, peracetic acid, perpropionic acid. In the case that Tf's or Xf's are each $CH_2=CH-C(O)-$, an acrylic acid is subjected to esterification-reaction with, for example, a perfluoro-group-containing di- or mono-alcohol.

The photopolymerization initiator used in the optical adhesive composition of the invention may be any one of a radical photopolymerization initiator or a cationic photopolymerization initiator, or may be a combination of the two. Examples of the radical photopolymerization initiator include acetophenones, aminoacetophenones, benzophenones, Michler's ketones, benzyls, benzoins, benzoin ethers, benzyl dimethyl ketals, and thioxanthones. Examples of the cationic photopolymerization initiator include diazonium salts, sulfonium salts, and iodonium salts. Specific examples of these initiators include radical photopolymerization initiators such as 1-hydroxy-cyclohexyl phenyl ketone, 2,2-dimethoxy-2-phenylacetophenone, benzophenone, benzoin isobutyl ether, 2-hydroxy-2-methyl-1-phenylpropane, α,α-dimethoxy-α-hydroxy-acetophenone, 1-[4-(2-hydroxyethoxy)phenyl]-2-hydroxy-2-methyl-propane-1-one, α-hydroxyisobutylphenone, and 2,4,6-trimethylbenzoyl-diphenylphosphine oxide; and cationic photopolymerization initiators such as benzenediazonium hexafluoroantimonate, benzenediazonium hexafluorophosphate, benzenediazonium hexafluoroborate, aromatic diazonium salts, diallyliodonium salts, triallylsulfonium salts, triallylcelenium salts, triallylpyrylium salts, benzylpyridium thiocyanate, dialkylphenacylsulfonium salts, dialkylhydroxyphenylsulfonium salts, and metallocene compounds. These may be used alone or in combination of two or more thereof. The sulfonium salts may not give a sufficient hardness only by irradiation with UV. On the other hand, the iodonium salts are used alone or in combination with a photopolymerization accelerator so as to make it possible to quickly cure the composition and can give a sufficient hardness by only ultraviolet rays.

The added amount of the photopolymerization initiator is preferably from 1 to 10 parts by weight, in particular preferably from 0.5 to 5 parts by weight for 100 parts by weight of the photopolymerizable compound(s) in the composition.

If necessary, a photopolymerization accelerator can be used, examples of which include anthracene, 9,10-dimethoxyanthracene, 9,10-dipropoxyanthracene, 9,10- dibutoxyanthracene, 2-ethyl-9,10-dimethoxyanthracene, 2-ethyl-9,10-dibutoxyanthracene, and 2-ethyl-9,10-dipropoxyanthracne.

The added amount of the photopolymerization accelerator(s) is preferably from 1 to 200 parts by weight, in particular preferably from 10 to 100 parts by weight for 100 parts by weight of the photopolymerization initiator.

Other additives which are ordinarily used in adhesives can be used in the composition of the invention as long as the object of the invention is not hindered. Examples of such additives include a silane coupling agent, a leveling agent, an antifoamer, and a tackiness agent. In particular, the addition of the silane coupling agent gives an advantageous effect that the stickiness to an inorganic optical fiber can be improved. Examples of the silane coupling agent include
γ-glycidoxypropyltrimethoxysilane,
γ-glycidoxypropyltriethoxysilane,
β-(3,4-epoxycyclohexyl)ethyltrimethoxysilane,
β-(3,4-epoxycyclohexyl)ethyltriethoxysilane, vinyltrimethoxysilane, and vinyltriethoxysilane. Such other components can be used, in particular, as long as various properties described below, such as refractive index, Tg, and viscosity, are not deteriorated.

The blended amount of the other additives is preferably 10 parts or less by weight, more preferably 5 parts or less by weight in 100 parts by weight of the composition of the invention.

With respect to the composition of the invention, the refractive index ($n_D$) measured at 25° C. in a liquid state before the composition is cured is preferably from 1.31 to 1.41, more preferably from 1.35 to 1.40 from the viewpoint of balance between curability and adhesiveness.

With respect to the composition of the invention, the addition of the silane coupling agent thereto produces an effect of making the refractive index high. Conversely, the addition of the compound represented by the general formula (II) thereto produces an effect of making the refractive index low. Accordingly, when these components are appropriately used, the refractive index of the composition of the invention can be adjusted into the above-mentioned range.

With respect to the composition of the invention, the Tg thereof after the composition is cured is preferably from 30 to 110° C. If the Tg is less than 30° C., the composition becomes soft when bonded and heated. Thus, the adhesive strength is easily lowered. If the Tg is more than 110° C., the composition is too hard, when an impact is applied thereto, the composition is easily peeled. The Tg is more preferably from 50 to 100° C., even more preferably from 70 to 90° C.

With respect to the composition of the invention, the viscosity at 25° C. is preferably 10 mpa·s or more and 2000 mpa·s or less. If the viscosity is lower than this range, the composition is not easily applied. Conversely, if the viscosity is higher, the adhesive does not penetrate sufficiently into a narrow gap. The upper limit is more preferably 500 mPa·s or less, even more preferably 200 mPa·s or less.

The process for producing the adhesive composition of the invention is not particularly limited, and it is sufficient that the raw materials thereof are mixed to be homogeneously blended. For example, an acrylate compound or epoxy compound of the general formula (I), an acrylate compound or epoxy compound of the general formula (II), a photopolymerization initiator, a coupling agent, and other necessary components are blended, and then the compositions are stirred/mixed and defoamed in a usual manner while heated under a reduced pressure. The stirring and mixing are performed for 30 minutes to 2 hours at a temperature of 40 to 80° C. under a reduced pressure of 1 to 20 Torr.

The composition of the invention can be preferably cured by irradiation with UV. The acrylate compound of the general formula (I) or the acrylate compound of the general formula (II) has a good curability, thus, the compound can be sufficiently cured even if the compound is irradiated with UV at less than 6.0 J/cm$^2$. The epoxy compound of the general formula (I) or the epoxy compound of the general formula (II) also has a good curability, thus, the compound can be sufficiently cured even if the compound is irradiated with UV at 6.0 J/cm$^2$. In the case of the epoxy compound, curing by heating can be used together in accordance with the photopolymerization initiator, therefore, curing by heating at 80° C. per hour can be used together.

The composition of the invention makes it possible to construct an optical connection having a very low refractive index by bonding and fixing an optical fiber and an optical component such as a connector to each other, or optical components to each other; therefore, even if the number of optical connections increases, an increase in transmission loss can be restrained. Thus, a very profitable method for bonding optical components is provided. In other words, in the case of using an optical devise wherein the above-mentioned optical adhesive composition is used to bond an optical fiber to an optical component, the optical device is made of an optical connection having a very low refractive index; therefore, even if such optical devices are accumulatively used, an increase in optical transmission loss can be restrained.

The invention will be described in more detail by way of examples described below; however, the invention is not limited thereto.

EXAMPLES 1 to 6, AND COMPARATIVE EXAMPLES 1 to 2

Two or more components were mixed in each proportion (parts by weight) in Table 1 so as to prepare each adhesive in a usual manner.

Abbreviations of the components in the table are as follows:

FA-16: acrylate compound manufactured by Kyoeisha Kagaku Co., Ltd. (acrylate compound wherein a=1, b=1, and m=8 in the general formula (I)), FE-16: epoxy compound manufactured by Kyoeisha Kagaku Co., Ltd. (epoxy compound wherein a=1, b=1, and m=8 in the general formula (I)), H022: epoxy compound manufactured by Tosoh F-tech, Inc. (epoxy compound wherein a=0, b=0, and m=4 in the general formula (I)), H010: epoxy compound manufactured by Tosoh F-tech, Inc. (epoxy compound wherein c=0, d=0, n=8, and A=F in the general formula (II)), CEOX2021P: alicyclic epoxy resin (Celloxide 2021P (trade name), manufactured by Daicel Chemical Industries, Ltd.), IC651: Irgacure 651 (trade name), radical photopolymerization initiator, manufactured by Ciba Specialty Chemicals Inc.

IC184: Irgacure 184 (trade name), radical photopolymerization initiator, manufactured by Ciba Specialty Chemicals Inc.

A2074: Photoinitiator 2074 (trade name), cationic photopolymerization initiator, manufactured by Rhodia Japan, Ltd., and UVI6976: Cationic photopolymerization initiator, manufactured by Dow Chemical Japan.

Evaluation Methods

Viscosity: the viscosity of each of the liquid adhesives adjusted to a temperature of 25° C. was measured with an E model (L type) rotary viscometer at a rotational speed of 5 rpm.

Refractive index: the refractive index was measured at 25° C. with a digital refractometer RX-5000 manufactured by Atago Co., Ltd., using the D-line (589 nm) of sodium.

Tg: each test piece having a thickness of 100 μm was measured with a DMS manufactured by Seiko Instrument Inc., using a shear mode. Tg was measured as the peak value of tanδ.

Adhesion strength: Each of the adhesive compositions was applied onto an alkali glass plates so as to have a thickness of about 20 μm, and then the glass plate was combined to other alkali glass plate, and the resultant was irradiated with light from a UV lamp at a radiation energy of 50 mW/cm² for 60 seconds. Thereafter, the two plates were applied to a tension tester to measure the tensile-shear adhesion strength (N/mm²). In Comparative Example 2, the composition was not cured by irradiation with UV, and was heated at 80° C. for an hour. However, the composition was not completely cured. Thus, the Tg thereof was unable to be measured.

Curability: A case wherein a cured product was obtained when any one of the compositions was irradiated with light at a radiation energy of 50 mW/cm for 60 seconds is represented by ○, and a case where a cured product was not obtained at the same condition is represented by x.

Tg. As for Comparative Example 2, the refractive index itself is low, but has a bad curability so as not to be used as an adhesive.

INDUSTRIAL APPLICABILITY

The optical adhesive of the invention has a low refractive index, and further satisfies various properties, such as low viscosity, fast curability, heat resistance, and adhesion strength. Thus, the adhesive is very useful for the connection of optical elements in a field where optical fibers are used, a typical example of which is an optical communication field.

The invention claimed is:

1. An optical adhesive composition, comprising: a compound represented by the general formula (I) wherein Tf's are each $CH_2=CH-C(O)-$, a compound represented by the general formula (I) wherein Tf's are each a glycidyl group, and a compound represented by the following general formula (II):

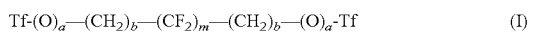  (I)

wherein plural a's are the same, and each represent 0 or 1, plural b's are the same, and each represent 0 or 1, m represents an integer of 4 to 12, and plural Tf's are the same and each represent a glycidyl group or $CH_2=CH-C(O)-$;

  (II)

TABLE 1

|  | Examples | | | | | | Comparative Examples | |
|---|---|---|---|---|---|---|---|---|
|  | 1 | 2 | 3 | 4 | 5 | 6 | 1 | 2 |
| FA-16 | 100 | — | 50 | — | 50 | — | — | — |
| EF-16 | — | — | — | 50 | — | — | — | — |
| H010 | — | — | — | — | 30 | — | — | 100 |
| H022 | — | 100 | 50 | 50 | 20 | 100 | — | — |
| CEOX2021P | — | — | — | — | — | — | 100 | — |
| IC651 | 2 | — | — | — | — | — | — | — |
| IC184 | — | — | 1 | — | 1 | — | — | — |
| A2074 | — | 2 | 1 | — | 1 | — | — | 2 |
| UVI6976 | — | — | — | 2 | — | 2 | 2 | — |
| Viscosity (25dC) | 40 | 25 | 60 | 35 | 25 | 25 | 190 | 30 |
| Refractive index (nD) (25° C.) | 1.38 | 1.38 | 1.38 | 1.38 | 1.36 | 1.38 | 1.50 | 1.32 |
| Tg | 86 | 67 | 62 | 60 | 81 | 60 | 190 | Not completely cured |
| Curability | ○ | ○ | ○ | ○ | ○ | ○ | ○ | x |
| Adhesion strength N/mm² | 3.9 | 2.9 | 4.4 | 2.3 | 4.8 | 4.4 | 4.9 | <0.1 |

From Examples 1 to 6, it is understood that the compositions of the invention each have a low viscosity, a low Tg (generally, less than 90° C. in Examples), and excellent curability and adhesion strength, and further the refractive indices of the compositions themselves have very low values (generally, 1.38 or less in Examples). On the other hand, Comparative Example 1, which is a conventional composition, has a high refractive index of 1.5, and further has a high wherein c represents 0 or 1, d represents an integer of 0 to 2, n represents an integer of 1 to 11, Xf represents a glycidyl group or $CH_2=CH-C(O)-$, and A represents H or F; and a photopolymerization initiator.

2. The composition according to claim 1, wherein the blended amount of the compound represented by the general formula (II) is less than 40 parts by weight per 100 parts by weight of the total of the compound and the compound represented by the general formula (I).

3. The composition according to claim 1, wherein the refractive index ($n_D$) measured at 25° C. in a liquid state before the composition is cured is from 1.31 to 1.36.

4. The composition according to claim 1, wherein the Tg after the composition is cured is from 30 to 110° C.

5. A method for bonding an optical component, using the optical adhesive composition according to claim 1.

6. An optical device comprising an optical fiber and an optical component, wherein the optical adhesive composition according to claim 1, is used to bond the optical fiber and the optical component to each other.

7. The composition according to claim 2, wherein the refractive index ($n_D$) measured at 25° C. in a liquid state before the composition is cured is from 1.31 to 1.36.

8. The composition according to claim 2, wherein the Tg after the composition is cured is from 30 to 110° C.

9. The composition according to claim 3, wherein the Tg after the composition is cured is from 30 to 110° C.

10. The composition according to claim 7, wherein the Tg after the composition is cured is from 30 to 110° C.

11. The method according to claim 5, wherein the optical adhesive composition is the composition in which the blended amount of the compound represented by the general formula (II) is less than 40 parts by weight per 100 parts by weight of the total of the compound and the compound represented by the general formula (I).

12. The method according to claim 5, wherein the optical adhesive composition is the composition in which the refractive index ($n_D$) measured at 25° C. in a liquid state before the composition is cured is from 1.31 to 1.36.

13. The method according to claim 5, wherein the optical adhesive composition is the composition in which the Tg after the composition is cured is from 30 to 110° C.

14. The optical device according to claim 6, wherein the Optical adhesive composition is the composition in which the blended amount of the compound represented by the general formula (II) is less than 40 parts by weight per 100 parts by weight of the total of the compound and the compound represented by the general formula (I).

15. The optical device according to claim 14, wherein the optical adhesive composition is the composition in which the refractive index ($n_D$) measured at 25° C. in a liquid state before the composition is cured is from 1.31 to 1.36.

16. The optical device according to claim 15, wherein the optical adhesive composition is the composition in which the Tg after the composition is cured is from 30 to 110° C.

* * * * *